United States Patent [19]

Yokokura et al.

[11] Patent Number: 4,909,629
[45] Date of Patent: Mar. 20, 1990

[54] LIGHT INTERFEROMETER

[75] Inventors: Takashi Yokokura; Nobuo Hori; Hiroaki Shimozono; Satoru Niimura, all of Tokyo, Japan

[73] Assignee: Kabushiki Kaisha Topcon, Tokyo, Japan

[21] Appl. No.: 215,856

[22] Filed: Jul. 6, 1988

[30] Foreign Application Priority Data

Jul. 7, 1987 [JP] Japan .................. 62-167727
Jul. 7, 1987 [JP] Japan .................. 62-167728
Jul. 29, 1987 [JP] Japan .................. 62-189448
Aug. 12, 1987 [JP] Japan .................. 62-201134

[51] Int. Cl.⁴ .......................................... G01B 11/02
[52] U.S. Cl. ............................................... 356/358
[58] Field of Search ...................................... 356/358

[56] References Cited

U.S. PATENT DOCUMENTS 4,531,196 7/1985 Lin ................................... 350/358
4,743,114 5/1988 Crane, Jr. ........................ 350/346

Primary Examiner—Léon Scott, Jr.
Attorney, Agent, or Firm—Finnegan, Henderson, Farabow, Garrett & Dunner

[57] ABSTRACT

A light interferometer has an interferometer portion for interfering a measuring light and a reference light, and a light signal processing portion for processing a signal according to an interference signal which changes according to the change of an optical path length of the measuring light. The interferometer portion has a first light source for generating a coherent light, a light interference portion for dividing the coherent light emitted by the first light source into a reference light and a measuring light in order to introduce the measuring light to an object, making the measuring light reflected by the object and the reference light interfered with each other and introducing thereof to a photo detector, and an optical path length periodically changing means for periodically changing the difference of an optical path length of the reference light with respect to the optical path length of the measuring light relatively at a constant amplitude. The light signal processing portion has a second light source for generating a coherent light, a collimate lens portion for collimating the coherent light emitted by the second light source, a space modulating portion for diffracting the coherent light outgoing from the collimate lens portion, a Fourier transforming portion for transforming the diffracted coherent light, and two photodetectors disposed on at a spot corresponding to a frequency composition equivalent to a frequency of the optical path length periodically changing means and the other at a spot corresponding to a frequency composition two times the first-mentioned frequency composition in order to extract these frequency compositions out of frequency compositions which have been decomposed in frequency spectral by the Fourier transforming portion.

21 Claims, 12 Drawing Sheets

LIGHT INTERFEROMETER

BACKGROUND OF THE INVENTION

1. Field of the Invention

This invention relates to a light interferometer for detecting the direction of phase change of a measuring light, i.e., the direction toward which the optical path length of a measuring light is increased or decreased according to an interference signal which is changed in accordance with the change of the optical path of length of the measuring light. The invention is also relates to an optical integrated circuit for the use in the light interferometer.

2. Description of the Prior Art

Heretofore, there has been known a bulk type phase modulation interferometer as shown in FIG. 15. This conventional bulk type phase modulation interferometer includes a laser beam light source 1. The laser beam light source 1 emits a laser beam as a coherent light P. An outgoing optical path of the laser beam is provided at its midway with a half mirror 2 for dividing the optical path.

The half mirror 2 divides the laser beam into a reference light $P_1$ and a measuring light $P_2$. The reference light $P_1$ is reflected by a reference prism 3, whereas the measuring light $P_2$ is reflected by a measuring prism 4. The reference light $P_1$ reflected by the reference prism 3 and the measuring light $P_2$ reflected by the measuring prism 4 are interfered with each other and guided to a photodetector 5 as an interference light. In the bulk type phase modulation, the measuring prism 4 is moved in the direction as shown by an arrow or in the direction opposite thereto, whereas the reference prism 3 is periodically vibrated at a constant amplitude and at a predetermined cycle.

In this way, if the optical path length of the reference light $P_1$ is periodically changed at a predetermined amplitude, an interference signal, which is changed in accordance with the change of the optical path length of the measuring light $P_2$, is taken off the photodetector 5.

The vibrating frequency of the reference prism 3 is represented by $f_1$, and an alternating current-like changing composition corresponding to the vibrating frequency $f_1$ and an alternating current-like changing composition corresponding to frequency which is two times of the vibration frequency $f_1$ are extracted out of the frequency compositions of the interference signal, respectively. Since the amplitude of the extracted alternating current-like changing composition becomes a sine-wave and a cosine-wave when the measuring prism 4 is moved, there can be obtained two kinds of electric signals which are different in phase difference by $\pi/2$ based on the extracted two kinds of different alternating current-like compositions. Therefore, if the two kinds of electric signals, which are different in phase difference by $\pi/2$, are processed, there can be found a phase change direction (the moving direction of the measuring prism 4) of the measuring light and there can also be measured the moving amount of the measuring prism 4 without being affected by a direct current bias composition based on the change of light quantity.

Therefore, if this light interferometer is used in a length measuring machine, the length of an objective substance can be measured in such degree of accuracy as less than a portion of the unit of wavelength. The moving direction of the objective substance can also be measured.

The alternating current-like changing composition corresponding to the vibrating frequency $f_1$ and the alternating current-like changing composition corresponding to the frequency two times of the vibrating frequency $f_1$ are extracted out of the frequency compositions of the interference signal by electric processing using a band pass filter comprising a CR circuit, etc.

Also, there has been known a recurrent optical system type light integrated interferometer as shown in FIGS. 16 and 17. In FIGS. 16 and 17, 6 denotes a thin film substrate formed with a two-dimension type wave guide passageway. The thin film substrate 6 comprises three layers of thin films 7, 8 and 9. The thin film 7 has at least a light permeability. The refractive index of the thin film 7 is larger than those of the thin films 8 and 9 at both sides thereof. The coherent light P emitted by a light source 10 is made incident to the thin film substrate 6. The coherent light P is reflected by two interfaces or boundary surfaces between the thin film 7 and the thin films 8, 9 and propagated through the interior of the thin film 7. The thin film substrate 6 is provided at its incidence side with a collimater lens system 11. The coherent light P made incident to the thin film 7 is made into a parallel pencil of rays by the collimater lens system 11. The parallel pencil of rays are divided into a reference light $P_1$ and a measuring light $P_2$.

The reference light $P_1$ is reflected by a reference mirror 13 formed on the thin film substrate 6 and returned to the half mirror system 12 again. The measuring light $P_2$ is reflected by a measuring mirror 14 as an object and returned to the half mirror system 12. The returned measuring light $P_2$ and reference light $P_1$ are composed by the half mirror system 12 and introduced to a measuring lens 15 as an interference light. The interference light is emitted outside the film from an outgoing prism 16. The interference light emitted by the prism 16 is dark under the conditions that the wavelength of the coherent light P is represented by $\lambda$, and the difference of the optical path length of the reference light $P_1$ multiplies oddly as against $\lambda/2$. On the other hand, when the difference multiplies integrally as against $\lambda/2$, the interference light is bright. Therefore, if the measuring mirror 14 is moved in the direction as shown by an arrow G, the interference signal based on the interference light has a bright portion A and a dark portion B alternately, as shown in FIG. 18, every time the moving amount is increased by $\lambda/2$. Therefore, by counting the number of the bright and dark portions A and B, the moving amount of the measuring mirror 14 can be found. Similarly, by counting the moving amount from the origin, the length of the objective substance can be measured.

However, in the case of the bulk type phase modulation interferometer, since the reference prism 3 itself is large, the reference prism 3 is difficult to be vibrated stably at a constant vibration and at a constant cycle. Moreover, it is not preferable that the alternating current-like changing component corresponding to the vibrating frequency $f_1$ and the alternating current-like changing composition corresponding to the frequency two times the vibrating frequency $f_1$ are extracted out of the frequency compositions of the interference signal by electric processing using a band pass filter comprising a CR circuit, etc., because the frequency characteristics are unstable due to change of temperature, etc. On the other hand, in the case of the light integrated type interferometer, even if the measuring mirror 14 is moved in the reversed direction H, the bright and dark portions A and B are produced in the same manner. Accordingly, the phase changing direction of the measuring light cannot be detected. Furthermore, since the light intergrated type interferometer directly receives the fluctuation of the direct current bias composition, it is difficult to obtain such degree of accuracy as λ/2 or more.

Furthermore, in this kind of light integrated type interferometer, the measuring light $P_2$ reflected by the mirror 14 is partly reflected by the half mirror system 12 and returned to the light source 10. Similarly, the reference light $P_1$ reflected by the reference mirror 13 is also partly passed through the half mirror 12 and returned to the light source 10. Accordingly, the output of the light source 10 is fluctuated by the return light, and an accurate measurement is difficult to carry out.

SUMMARY OF THE INVENTION

It is therefore a first object of the present invention to provide a light interferometer which can stably and easily measure the phase difference direction of measuring light according to the movement of an objective substance and in which a high resolution can be obtained by removing a direct current bias composition.

In order to achieve the above-mentioned object, a light interferometer according to the present invention comprises an interferometer portion for interfering a measuring light and a reference light, and a light signal processing portion for processing a signal according to an interference signal which changes according to the change of an optical path length of the measuring light.

The interferometer portion includes a first light source for generating a coherent light, a light interference portion for dividing the coherent light emitted by the first light source into a reference light and a measuring light in order to introduce the measuring light to an object, making the measuring light reflected by the object and the reference light interfered with each other and introducing thereof to a photo detector, and an optical path length periodically changing measn for periodically changing the difference of an optical path length of the reference light with respect to the optical path length of the measuring light relatively at a constant amplitude. The light signal processing portion includes a second light source for generating a coherent light, a collimate lens portion for collimating the coherent light emitted by the second light source, a space modulating portion for diffracting the coherent light outgoing from the collimate lens portion, a Fourier transforming portion for transforming the diffracted coherent light, and two photodetectors disposed one at a sport corresponding to a frequency composition equivalent to a frequency of the optical path length periodically changing means and the outer at a spot corresponding to a frequency composition two times the first-mentioned frequency composition in order to extract these frequency compositions out of frequency compositions which have been decomposed in frequency spectral by the Fourier transforming portion.

The first object can also be achieved by a light interferometer including a light source for generating a coherent light, a thin film substrate formed with a wave guide passageway for dividing the coherent light emitted from the light source into a reference light and a measuring light, guiding the measuring light to an object, causing the measuring light reflected by the object to be interfered with the reference light and guided to a photodetector, and an optical path length periodically changing means for periodically changing the difference of the optical path length of the reference light with respect to that of the measuring light relatively at a constant amplitude.

A second object of the present invention is to provide a light interferometer which is designed as such that a bundle lf light reflected by an object is not returned to a light source.

A light interferometer for achieving the second object comprises a light source for generating a linearly polarized xcoherent light, a thin film substrate formed with an outgoing wave guide path for emitting the coherent light coming from the light source toward an object as a measuring light, a reference wave guide path optically connected to the outgoing wave guide path and adapted to divide the coherent light into the measuring light and refrnece light, and an incident wave guide path optically connected with the reference wave guide path and adapted to cause the measuring light reflected by the object to be interfered with the reference light and guide it to a photodetector, an optical path length periodically changing means for periodically changing the difference of the optical path length of the reference light with respect to that of the measuring light relatively at a constant amplitude, a measuring light polarizing means disposed at the thin film substrate and adapted to polarize the measuring light emitted toward the object and reflected by the object so that the measuring light will not be made incident to the outgoing wave guide path and will be made incident to the incident wave guide path, and a mode establishing means for establishing a polarization mode of the measuring light which has made incident to the incident wave guide path to that of the reference light which is made incident to the incident wave guide path via the reference wave guide path.

A third object of the present invention is to provide a light interferometer, in which an optical path can be switched.

The third object can be achieved by using an optical integrated circuit element, in which an incoming wave guide path and a plurality of outgoing wave guide paths are connected by two parallel wave guide paths disposed in parallel relation, and at least one of the two parallel wave guide paths is provided with an optical path length changing means for changing an optical path length. If the optical path difference between one parallel wave guide path connected to one outgoing wave guide path and the other parallel wave guide path is made into $(\frac{1}{2})\lambda + n\lambda$ (wherein n is integer) by the optical path length changing means, and if the optical path difference between one parallel wave guide path connected to the other outgoing wave guide path and the other parallel wave guide path is made into $n\lambda$ (wherein n is integer) by the optical path length changing means, the coherent light propagating the incoming wave guide path is emitted from the outgoing wave guide path. If the optical path difference is made into the opposite way, the coherent light is emitted from one outgoing wave guide path.

BRIEF DESCRIPTION OF THE DRAWINGS

FIGS. 1 through 9 are illustrations showing several embodiments for achieving the first object of the present invention, wherein;

FIG. 1 is a schematic view showing an important portion of the first embodiment for achieving the first object of the present invention;

FIG. 2 is a schematic view showing a processing circuit for processing an electric signal according to an interference signal obtained by the light interferometer;

FIGS. 3 and 4 are timing charts of the processing circuit;

FIG. 5 is a schematic view showing an important portion of the second embodiment for achieving the first object of the present invention;

FIG. 6 is a schematic view showing an important portion of the third embodiment for achieving the first object of the present invention;

FIG. 7 is a schematic view showing an important portion of the fourth embodiment for achieving the first object of the present invention;

FIG. 8 is a schematic view showing an important portion of the fifth embodiment for achieving the first object of the present invention;

FIG. 9 is a schematic view showing the sixth embodiment for achieving the first object of the present invention;

FIGS. 10 through 13 are illustrations showing several embodiments for achieving the second object of the present invention, wherein;

FIG. 10 is a plan view showing the first embodiment for achieving the second object of the present invention;

FIGS. 11 through 13 are schematic views showing the second to fourth embodiments for achieving the second object of the present invention;

DETAILED DESCRIPTION OF THE EMBODIMENTS

Several embodiments for achieving the first through the third objects of the present invention will be described with reference to the accompanying drawings.

Embodiments for Achieving the First Object

Figure 1:
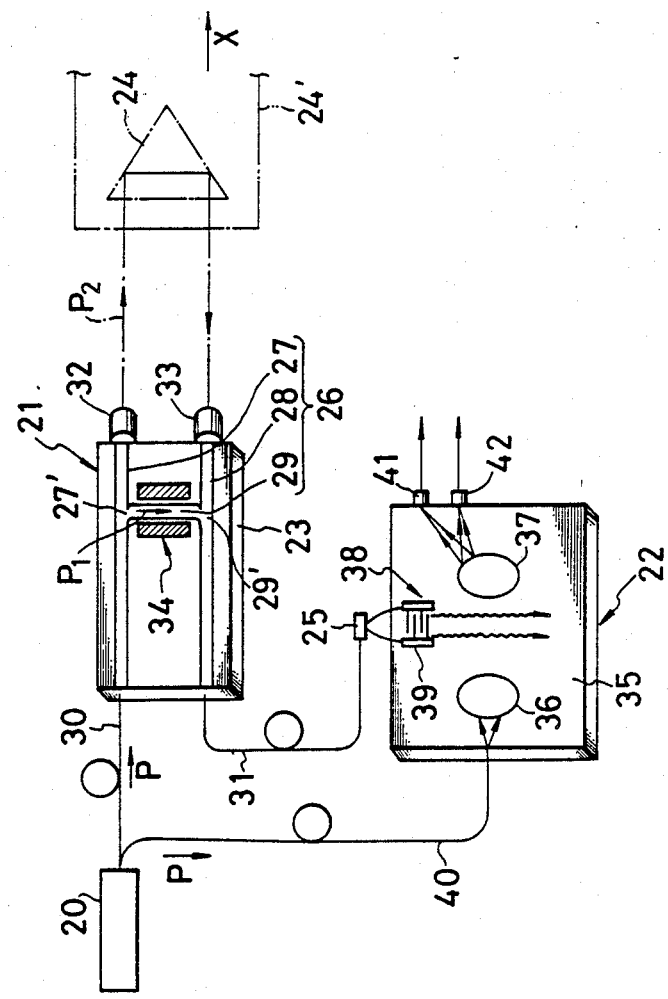

In FIG. 1, 20 denotes a laser beam light source for emitting a laser beam, 21 denotes a light integrated type interferometer, and 22 denotes an optical integrated circuit type spectral analyzer. The laser beam light source 20 functions as a first and a second light sources for generating a coherent light P. The first light source is a light source of an interferometer for causing a measuring light to be interfered with a reference light, whereas the second light source is a light source of a light signal processing portion for processing an interference signal which is changed in accordance with the change of an optical path length of the measuring light. The optical integrated circuit type interferometer 21 functions as an light interference portion for dividing the coherent light P into a reference light and a measuring light, guiding the measuring light to an objective substance, causing the measuring light reflected by the objective substance to be interfered with the reference light and guiding it to a photodetector. The optical integrated circuit type interferometer 21 includes a thin film substrate 23. The thin film substrate 23 has an angular size of several ten mm and is formed with a wave guide path 26. The wave guide path 26 has such a function as to divide the laser beam into a reference light $P_1$ and a measuring light $P_2$, guide the measuring light $P_2$ to a corner cube 24 as an objective substance, causing the measuring light $P_2$ reflected by the corner cube 24 to be interfered with the reference light $P_1$ and guide it to a photodetector 25.

The wave guide path 26 includes an outgoing wave guide path 27, an incident wave guide path 28 and a reference wave guide path 29. the outgoing wave path 27 has such a function as to emit the measuring light $P_2$ toward the corner cube 24. The incident wave guide path 28 has such a function as to guide the measuring light reflected by the corner cube 24 toward the photodetector 25 as a return light. The reference wave guide path 29 has such a function as to divide and take off the reference light $P_1$ from the outgoing wave guide path 27 and guide it to the incident wave guide path 28. The wave guide path 26 is formed on the thin film substrate 23. The outgoing wave guide path 27 and the incident wave guide path 28 are in parallel relation. The reference wave guide path 29 extends in the direction perpendicular to the outgoing wave guide path 27 and incident wave guide path 28. The reference wave guide path 29 is connected with the outgoing wave guide path 27 and incident wave guide path 28 at gentle angles. The outgoing wave guide path 27 is made incident with the coherent light P through an optical fiber 30. The photodetector 25 is made incident with an interference light through an optical fiber 31. The measuring light $P_2$ is emitted from an outgoing rod lens 32 as a parallel pencil of rays and its return light is condensed by an incident rod lens 33.

In this embodiment, the thin film substrate 23 is made of a material having an electro-optic effect such as, for example, $LiNbO_3$. In the vicinity of the reference wave guide path 29, a pair of electrodes 34 are disposed in the vicinity of the path 29. The electrode 34 is incurred with an alternating voltage V of a predetermined cycle $2\pi f_1 t$ and amplitude $V_o$.

The refractive index n of the reference wave guide path 29 is periodically changed within a range of a constant amplitude n about the refractive index $n_o$ in accordance with the change of the voltage V. By this, the difference of the optical path length of the reference light $P_1$ with respect to the optical path length of the measuring light $P_2$ is periodically changed at a constant amplitude. That is, the electrode 34 functions as an optical path length periodically changing means for periodically changing the difference of the optical path length of the reference light $P_1$ with respect to the optical path length of the measuring light $P_2$ at a constant amplitude.

In this embodiment, the corner cube 24 is disposed at a movable stage 24' of a length measuring machine. The difference of the optical path length of the reference light $P_1$ with respect to that of the length measuring machine $P_2$ is represented by 2L. The difference 2L is a numerical figure obtained by deducting the optical path length of the reference light $P_1$ passing through the reference wave guide path 29 from the optical path length of the measuring light $P_2$ obtained by adding the optical path length from a branch portion 27' of the outgoing wave guide path 27 and reference wave guide path 29 to the corner cube 24, the optical path length within the corner cube 24, and the optical path length from the corner cube 24 to the converged portion 29' of the incident wave guide path 28 and reference wave guide path 29. If the difference L of the optical path length is periodically changed at a constant amplitude, the intensity I(t) of the interference light is changed in accordance with the following relation;

$$I(t) = I_1 + I_2 + 2\sqrt{I_1 \cdot I_2} \cdot \cos[4\pi/\lambda\{L - \Delta(t)\} + \phi] \quad (1)$$

wherein $I_1$ and $I_2$ represent the intensity amplitude of the reference light $P_1$ and measuring light $P_2$, $\Delta(t)$ represents a periodically changing portion of the difference L of the optical path length, and $\phi$ represents a phase.

$$\text{Suppose } \Delta(t) = \epsilon \cos \omega_1 t \quad (2)$$

wherein represents the amplitude of the changing composition of the optical path length of the reference light wave guide path 29. The relation (1) can be rewritten as follows;

$$I(t) = I_1 + I_2 + 2\sqrt{I_1 \cdot I_2} \cdot \quad (3)$$

$$\cos[4\pi/\lambda\{L - \xi \cdot \cos\omega_1 t\} + \phi] =$$

$$I_1 + I_2 + 2\sqrt{I_1 \cdot I_2} \cdot \cos[(4\pi L/\lambda + \phi) - (4\pi/\lambda) \cdot \xi \cdot \cos\omega_1 t]$$

Therefore, if the relation (3) is developed by Bessel function under the conditions of $(4\pi L/\lambda + \phi) \equiv \phi$, $2\pi/\lambda \equiv k$, it becomes as follows;

$$I(t) = I_1 + I_2 + 2\sqrt{I_1 \cdot I_2} \cdot \cos[\phi - 2k\xi\cos\omega_1 t] = \quad (4)$$

$$I_1 + I_2 + 2\sqrt{I_1 \cdot I_2} \cdot \{J_0(2k\xi) - J_2(2k\xi)x\cos(2\omega_1 t) +$$

$$J_4(2k\xi)\cos(4\omega_1 t) - \ldots\}x\cos\theta + 2\sqrt{I_1 \cdot I_2} \cdot$$

$$\{J_1(2k\xi)\cos(\omega_1 t) - J_3(2k\xi)\cos(3\omega_1 t) + \ldots\}x\sin\theta$$

Only the frequency compositions of $f_1 = \omega_1/2\pi$, $f_2 = 2f_1 = \omega_1/\pi$ are extracted in the manner as follows;

$$I(f_1) = 2\sqrt{I_1 \cdot I_2 \cdot J_1}(2k\xi) \cdot \cos(\omega_1 t) \cdot \sin = \quad (5)$$

$$2\sqrt{I_1 \cdot I_2 \cdot J_1}(2k\xi) \cdot \sin\theta \cdot \cos(2\pi f_1 t) =$$

$$[2\sqrt{I_1 \cdot I_2 \cdot J_1}(4\pi\xi/\lambda) \cdot \sin\{(4\pi/\lambda) \cdot L + \phi\}]\cos(2\pi f_1 t)$$

$$I(f_2) = -2\sqrt{I_1 \cdot I_2 \cdot J_2}(2k\xi) \cdot \cos(2\omega_1 t) \cdot \cos\theta = \quad (6)$$

$$-2\sqrt{I_1 \cdot I_2 \cdot J_2}(2k\xi) \cdot \cos\theta \cdot \cos(2\pi 2f_1 t) =$$

$$[-2\sqrt{I_1 \cdot I_2 \cdot J_2}(4\pi\xi/\lambda) \cdot \cos\{(4\pi/\lambda)L + \phi\}]\cos(2\pi \cdot 2f_1 t)$$

The relations (5) and (6) show the distribution of light intensity of the interference light of the frequency compositions $f_1$ and $f_2$. If attention is paid to the amplitude portion of $\cos(2\pi f_1 t)$ and $\cos(2\pi 2f_1 t)$, $[2\sqrt{I_1 \cdot I_2}.J_1$ $(4\pi\epsilon/\lambda)]$ and $[-2\sqrt{I_1.I_2}.J_2(4\pi\epsilon/\lambda)]$ are constant, and $[\sin\{(4\pi/\lambda).L+\phi\}]$ and $[\cos\{(4\pi/\lambda).L+\phi\}$, if the corner cube 24 is moved, are changed like sine-wave and cosine-wave. Therefore, the light intensity of the frequency compositions $f_1$ and $f_2$ will be extracted from the coherent light according to the interference signal obtained by the interference light which is changed in accordance with the relation (4). Then, the amplitude of the light intensity of the frequency compositions $f_1$ and $f_2$ is changed in accordance with the change of the moving amount L.

From a signal processing view point, the sizes of the light intensity amplitudes $J_1(2k\epsilon)$ and $J_2(2k\epsilon)$ are preferably generally the same. In order to establish the sizes of the light intensity amplitudes $J_1(2k\epsilon) = J_2(2k\epsilon)$ generally the same, the relation between $\epsilon$ and $\lambda$ is found by solving the equation of $J_1(2k\epsilon) = J_2(2k\epsilon)$. If the aforementioned equation is solved, there can be obtained a relation of $\epsilon \approx 2.9 \lambda/4\pi$.

The light integrated type spectral analizer 22 has such a function as to extract the spectrals of the frequency compositions $f_1$ and $f_2$. The light integrated type spectral analizer 22 is formed on its thin film substrate 35 with geodesic lenses 36 and 37 and a SAW transducer 38. The SAW transducer 38 includes a cross finger electrode 39. The cross finger electrode 39 is incurred with an interference signal of the photodetector 25 in accordance with the interference light. The thin film substrate 35 is made incident with a laser beam through an optical fiber. The geodesic lens 36 functions as a collimate lens of a laser beam. The geodesic lens 37 functions as a Fourier transform lens.

The SAW transducer 38 functions as a space modulation portion for diffracting a laser beam. When an interference signal is incurred to the cross finger electrode 39, the laser beam made incident to the thin film substrate 35 through the optical fiber 40 is diffracted by a surface elasticity wave. This diffracted light is Fourier transformed by the geodesic lens 37. By this, a light intensity distribution in proportion to the frequency power spectral of the interference signal is obtained on the focal surface of the geodesic lens 37. Therefore, photodetector 41 and 42 are disposed at places one of which corresponds to the frequency $f_1$ on the focal surface and the other of which corresponds to the frequency $2f_1$. And, when a photoelectric transfer is performed by the photodetectors 41 and 42, electric signals $Q_1$ and $Q_2$ of the frequencies $f_1$ and $2f_1$ can be obtained.

An electric signal processing circuit will now be described with reference to FIGS. 2 through 4.

Figure 2:
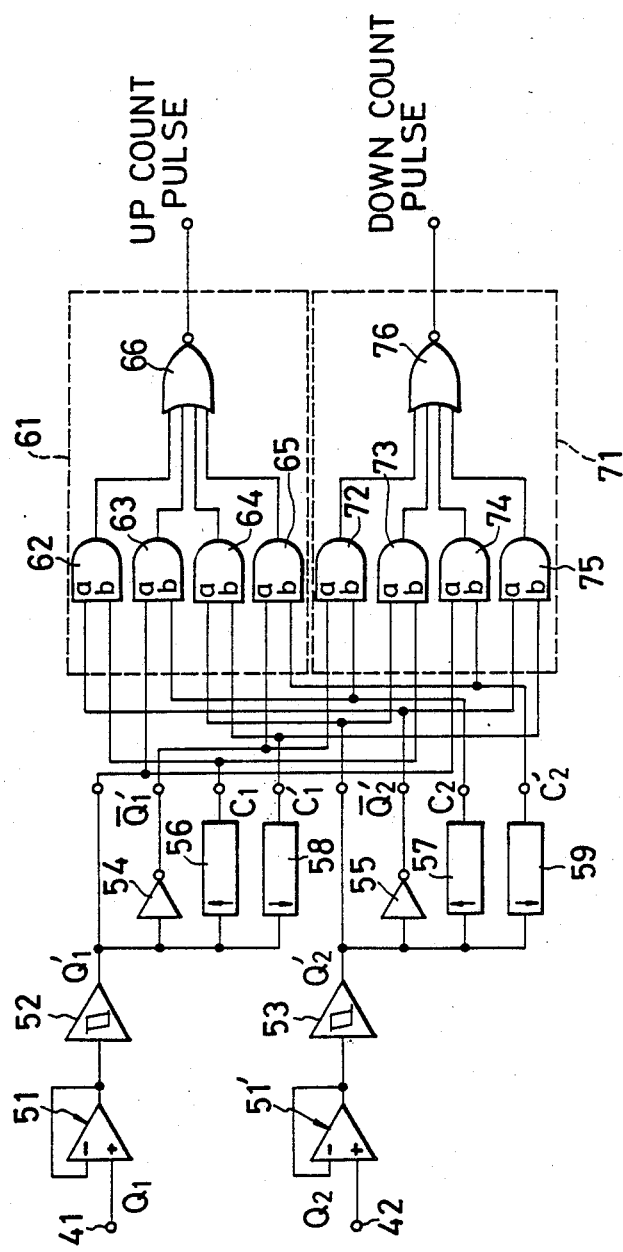

In FIG. 2, 51 and 51' denote amplifiers for amplifying the electric signals $Q_1$ and $Q_2$ output from the photodetectors 41 and 42. The electric signals $Q_1$ and $Q_2$, if the difference 2L of the optical path length of the measuring light $P_2$ is taken on the lateral axis, become sine-wave and cosine-wave. 52 and 53 denote schmidt circuits for shaping electric signals output from the amplifiers into square waves $Q_1'$ and $Q_2'$ (see FIGS. 3 and 4), 54 and 55 denote inverters, 56 and 57 denote one-shot circuits for generating one-shot pulses $C_1$ and $C_2$ when the square waves $Q_1'$ and $Q_2'$ output from the schmitt circuits 52 and 53 are stood up, 58 and 59 denote one-shot circuits for generating one-shot pulses $C_1'$ and $C_2'$ when the square waves $Q_1'$ and $Q_2'$ are fallen, and 61 denotes an upcount gate circuit for outputting one-shot pulses $C_1$, $C_2$, $C_1'$ and $C_2'$, as upcount pulses, generated at the various one-shot circuits 56 through 59 when the corner cube 24 is moving in the X-direction. The upcount gate circuit 61 comprises AND circuits 62 through 65 and an OR circuit 66. 71 denotes a downcount circuit for outputting one-shot pulses $C_1$, $C_2$, $C_1'$ and $C_2'$, as downcount pulses, generated at the various one-shot circuits 56 through 59 when the corner cube 24 is moving in the direction opposite the X-direction. The downcount circuit 71 comprises AND circuits 72 through 75 and an OR circuit 76.

When the corner cube 24 is stopping at the origin O, the electric signals $Q_1$ and $Q_2$ output from the photodetectors 41 and 42 are constant and are not changed. The corner cube 24 is moved from the origin O in the X-direction. Then, the difference 2L of the optical path length of the measuring light $P_2$ is continuously changed. At that time, the amplitudes of the electric signals $Q_1$ and $Q_2$ are periodically changed every time the difference 2L of the optical path length of the measuring light $P_2$ is increased by $\lambda$.

The electric signals $Q_1$ and $Q_2$ are displaced in phase of $\lambda/2$. Therefore, every time the corner cube prism 24 is moved by $\lambda/8$, one-shot pulses $C_1$, $C_2$, $C_1'$ and $C_2'$ are generated. The one-shot pulses $C_1$, $C_2$, $C_1'$ and $C_2'$ are input in input terminals b of the AND circuits 62 through 65. Input terminals a of the AND circuits 62 and 75 are input with the output $Q_2'$ of the inverter 55. Input terminals of the AND circuits 64 and 73 are input with the square wave $Q_2'$. Input terminals a of the AND circuits 65 and 72 are input with the output $Q_1'$ of the inverter 54.

When the corner cube 24 is moved in the direction as shown by an arrow X, the input terminals b of the AND circuits 62 through 65, when the input terminals a are in the H level, are input with the one-shot pulses $C_1$, $C_2$, $C_1'$ and $C_2'$. Since the input terminals b of the AND circuits 72 through 75, when the input terminals a are in the L level, are input with the one-shot pulses $C_1$, $C_2$, $C_1'$ and $C_2'$, the AND circuits 62 through 65 permit the one-hot pulses $C_1$, $C_2$, $C_1'$ and $C_2'$ to pass therethrough. On the other hand, the AND circuits 72 through 75 prevent the passage of the one-shot pulses $C_1$, $C_2$, $C_1'$ and $C_2'$. As a result, an upcount pulse is output from the upcount gate circuit 61.

Figure 3:
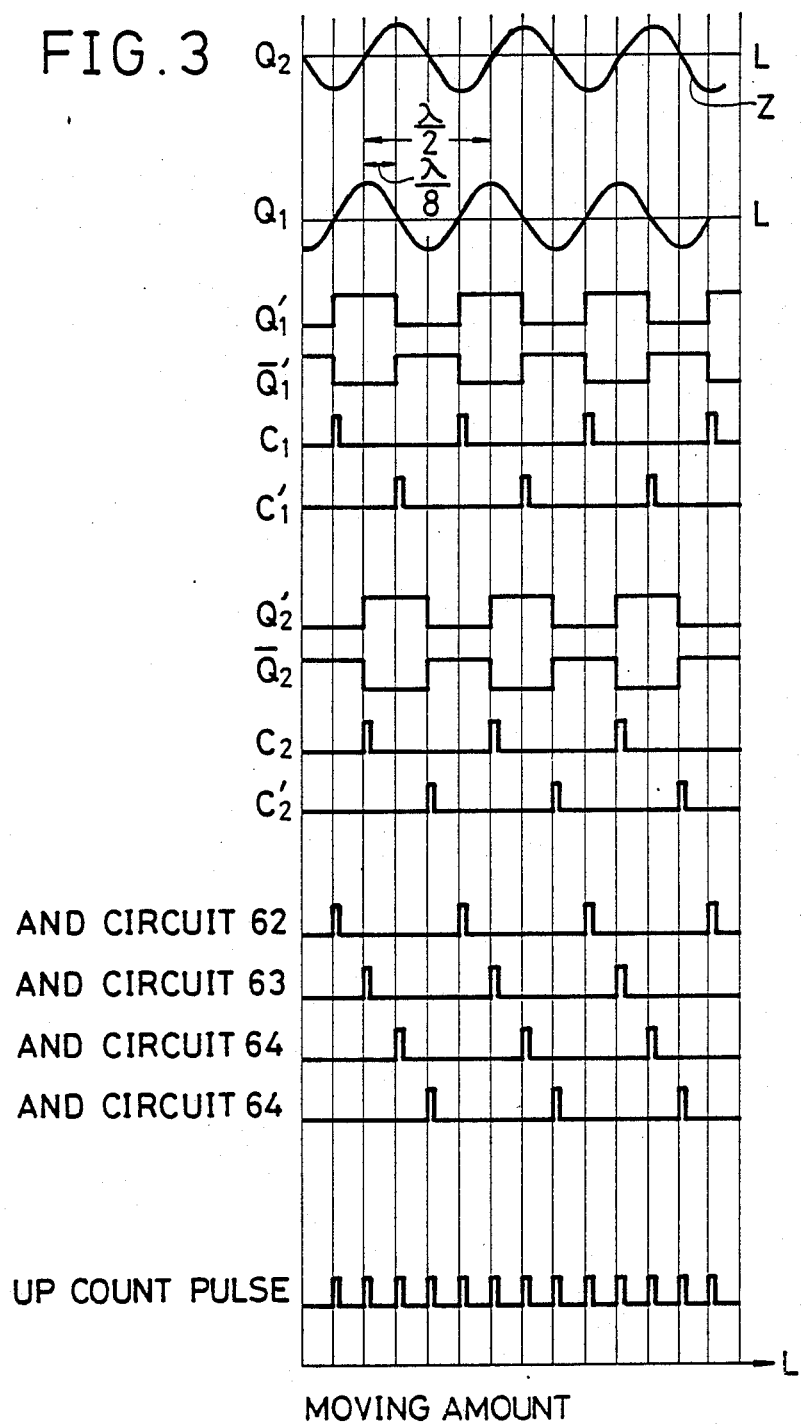
Figure 4:
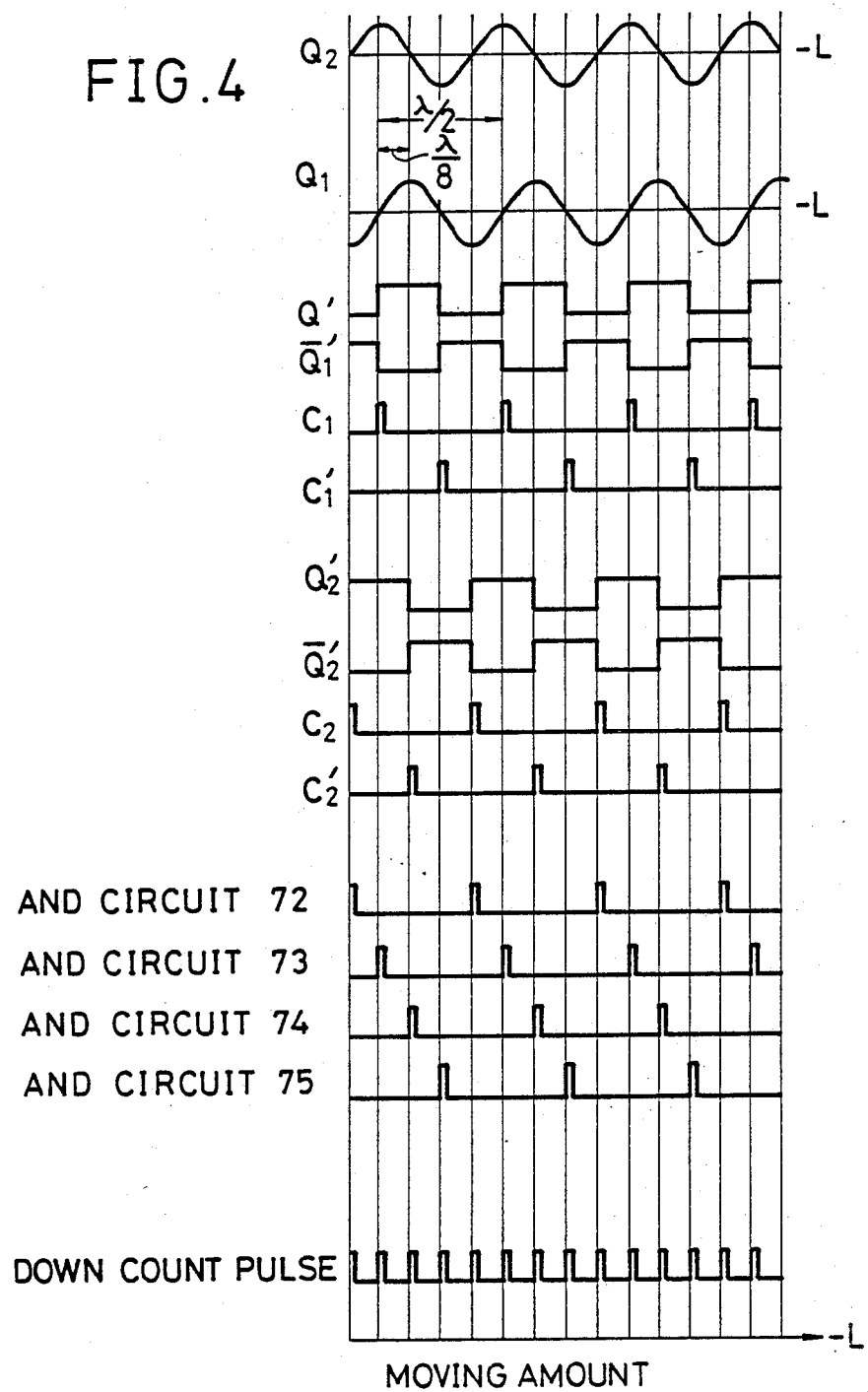

It is presumed here that the corner cube 24 has been moved in the direction opposite the arrow direction X at a point Z shown in FIG. 3, for example. Then, the electric signals $Q_1$ and $Q_2$ as shown in FIG. 4 can be obtained. The electric signals are of wave shape returned back by serving a point Z of the electric signals $Q_1$ and $Q_2$ shown in FIG. 3 as an origin $O_z$. That is, when the corner cube 24 is moved in the direction opposite the arrow X direction, the square waves $Q_1'$ and $Q_2'$ are stood up and fallen down, and there can be obtained such square waves $Q_1'$ and $Q_2'$ in that the square waves $Q_1'$ and $Q_2'$ are stood up and fallen down. When the corner cube 24 is moved in the direction opposite the arrow X direction, the input terminals b of the AND circuits 62 through 65, when the input terminals a are in the L level, are input with the one-shot pulses $C_1$, $C_2$, $C_1'$ and $C_2'$, whereas the input terminals b, when the input terminals a are in the H level, are input with the one-shot pulses $C_1$, $C_2$, $C_1'$ and $C_2'$. The AND circuits 62 through 65 prevent the passage of the one-shot pulses $C_1$, $C_2$, $C_1'$ and $C_2'$, whereas the AND circuits 72 through 75 permit the one-shot pulses $C_1$, $C_2$, $C_1'$ and $C_2'$ to pass therethrough. Therefore, a downcount pulse is output from the downcount gate circuit 62.

Accordingly, if, for example, the number of upcount pulses, when the corner cube 24 is moving in the direction away from the origin of the movable stage 24, is added and displayed on a display device in succession, and the number of downcount pulses, when the moving direction of the corner cube 24 is switched to the opposite direction in the middle, is deducted from the current count value, the position of the corner cube 24 can be known successively. In this case, it is taken into the fact that a phase difference of $\lambda/2$ is occurred when the light is reflected by hitting a dense material from a rough material.

Figure 5:
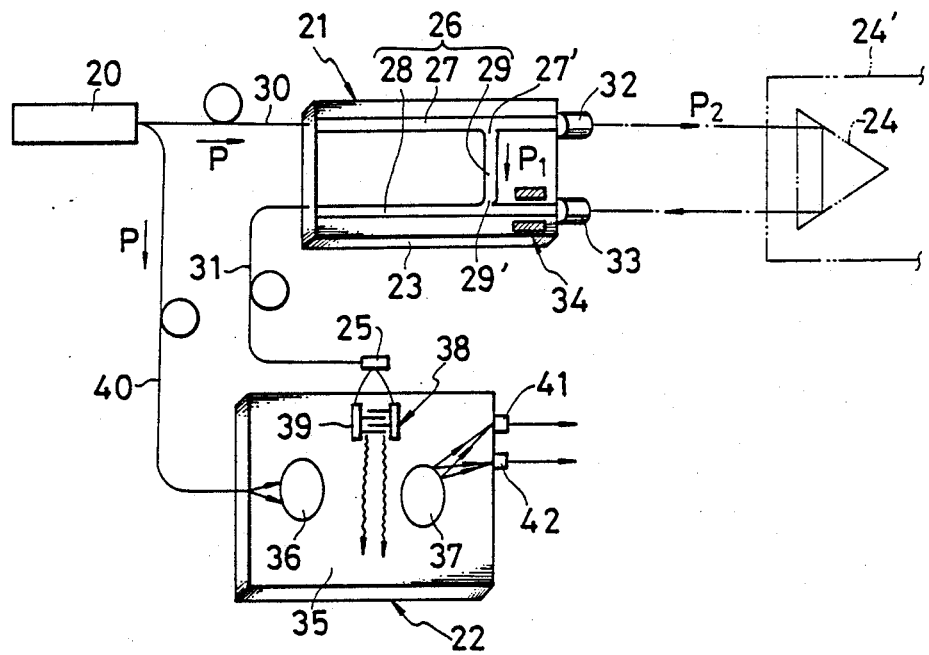

FIG. 5 illustrates the second embodiment of a light interferometer according to the present invention. In the second embodiment, instead of periodically changing relatively at a constant amplitude the difference of the optical path length of the reference light $P_1$ with respect to that of the measuring light $P_2$ by periodically changing the optical path length of the reference light $P_1$, there is disposed an electrode 34 having a voltage of a predetermined cycle in the vicinity of the incident wave guide path 28 and nearer to the incident side than the converging portion of the reference wave guide path 29 in order to make the optical path length of the measuring light $P_2$ periodically change at a constant amplitude. The electrode 34 may be disposed in the vicinity of the outgoing wave guide path 27 and nearer to the outgoing side than the branch portion 27' of the reference wave guide path 29.

Figure 6:
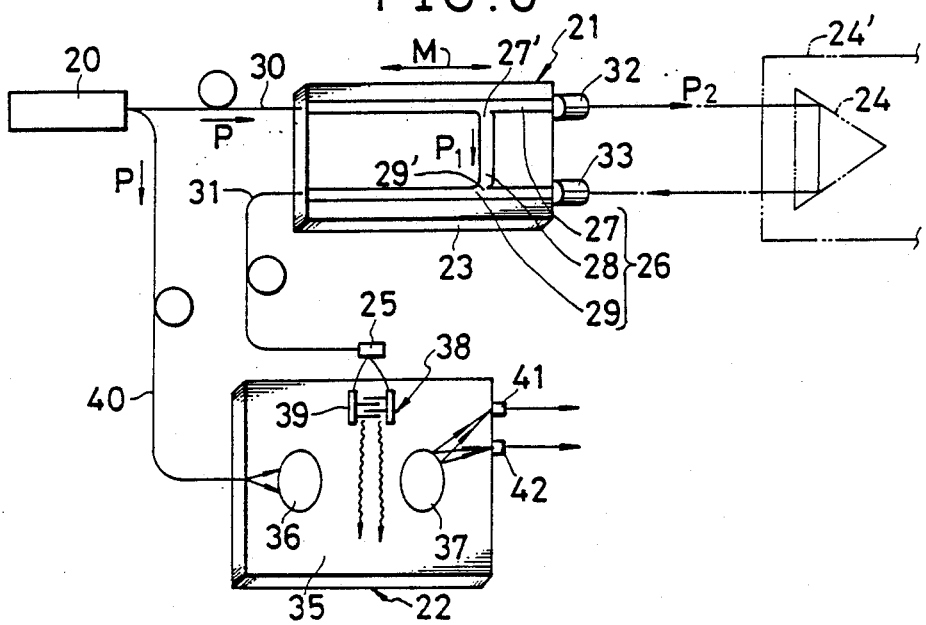

FIG. 6 illustrates the third embodiment of a light interferometer according to the present invention, in which the thin film substrate 21 is periodically vibrated at a constant vibration in the outgoing direction of the measuring light $P_2$, thereby to periodically changed at a constant amplitude the optical path length of the measuring light $P_2$. As means for vibrating the thin film substrate 21, a piezo element is used for example.

Figure 7:
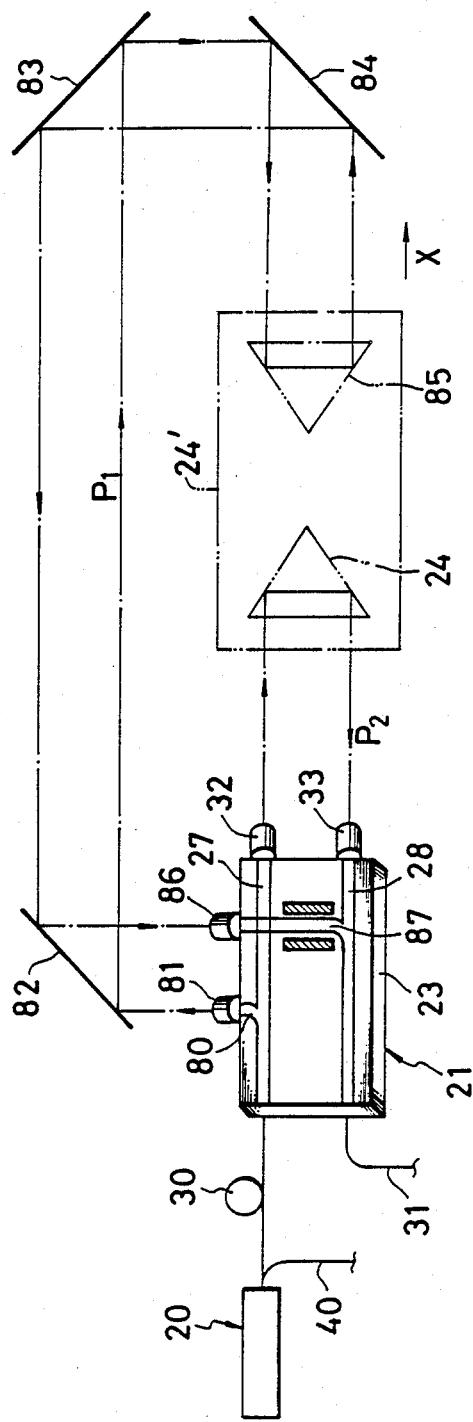

FIG. 7 illustrates the fourth embodiment of a light interferometer according to the present invention, in which the reference light $P_1$ is taken off to outside. The light interferometer according to the fourth embodiment includes a reference light outgoing wave guide path 80 branched off from an intermediate part of the outgoing wave guide path 27, and a reference light incident wave guide path 87 connected to an incident rod lens 86 and the incident wave guide path 28. The reference light $P_1$ is introduced to a corner cube 85 disposed at the movable stage 24' via an outgoing rod lens 81 connected to the reference light outgoing wave guide path 80 and through reflecting mirrors 82 through 84. And, the reference light $P_1$ is reflected by the corner cube 85 and introduced to the reference light incident wave guide path 87 again through the reflecting mirrors 82 through 84 and incident rod lens 86. In this interferometer, if the movable stage 24' is moved in the arrow X direction for example, the optical path length of the measuring light $P_2$ is increased and the optical path length of the reference light $P_2$ is decreased to the extent corresponding to the increased portion of the optical path length of the measuring light $P_2$, and the difference 2L between the optical path lengths is changed four times the moving amount.

Figure 8:
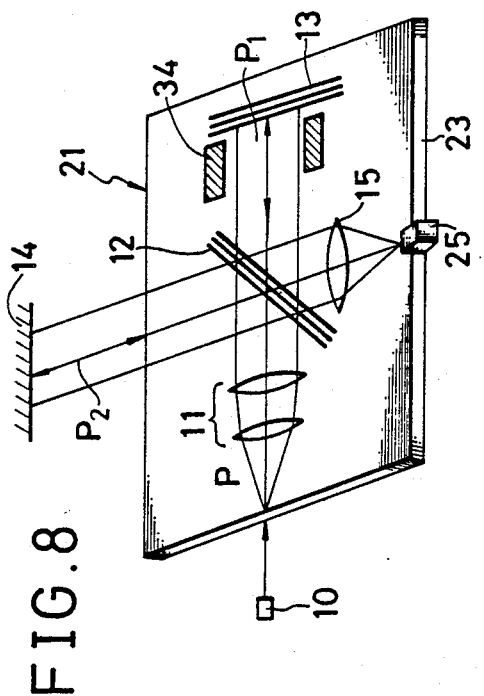

FIG. 8 illustrates the fifth embodiment of a light interferometer according to the present invention, in which the thin film substrates 23 comprises a two-dimension type wave guide path 26. This fifth embodiment is almost the same as the conventional light integrated type interferometer except that the electrode 34 and photodetector 25 are mounted on the thin film substrate 23. Like or identical component parts are denoted by like or identical reference numerals of the conventional art, and description thereof is eliminated.

Figure 9:
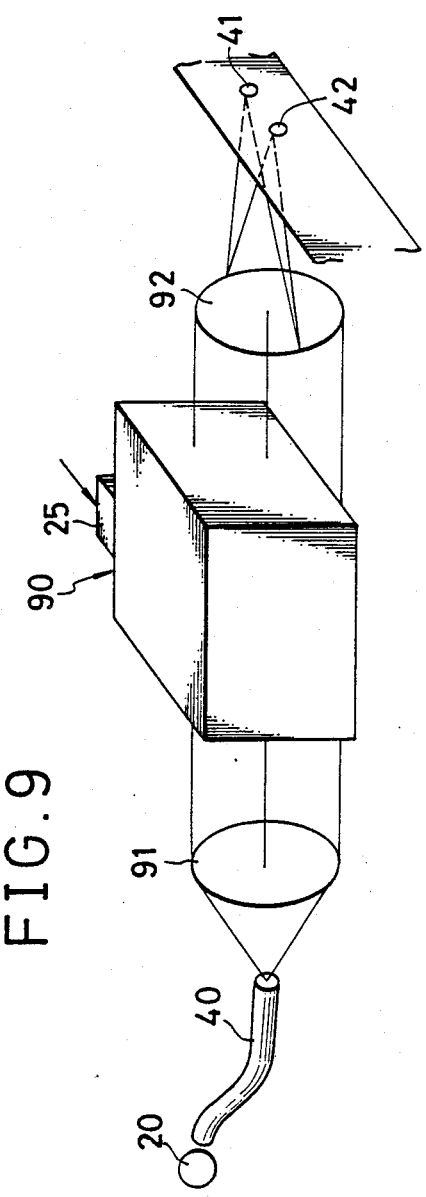

FIG. 9 illustrates the six embodiment of a light interferometer according to the present invention, in which the light signal processing portion is of bulk type. In the figure, 90 denotes a space modulation element comprising an electric optical crystal, 91 denotes a collimate lens, and 92 denotes a Fourier transform lens.

Although various embodiments have been described, instead of using the geodesic lens as the collimate lens and Fourier transform lens, a grating lens, etc. may be used.

Embodiment for Achieving the Second Object

The second object of the present invention can be achieved by the following constitution. FIGS. 10 through 14 illustrate the first through fourth embodiments for achieving the second object.

Figure 10:
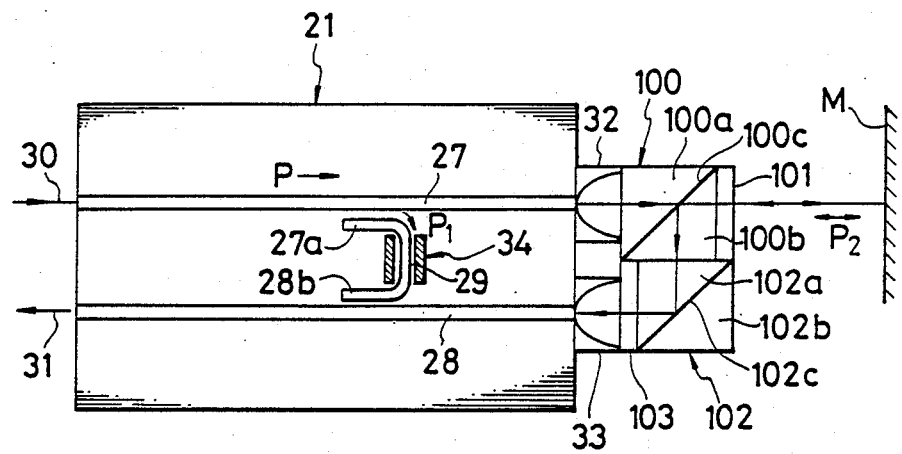

FIG. 10 illustrates the first embodiment for achieving the second object. In this embodiment, the coherent light P emitted by the laser beam light source 30 is linearly deflected. The coherent light P is made incident to the outgoing wave guide path 27 in its TE mode. The rod lens 32 is of refractive index distribution type, and the rod lens 32 is provided with a polarized beam splitter 100 which constitutes a measuring light polarizing means in cooperation with a quarter-wave plate and a total reflection prism as will be described. The polarized beam splitter 100 comprises two prisms 100a and 100b, and 100c denotes a reflecting surface thereof.

The coherent light P is emitted from the rod lens 32 as a parallel pencil of rays. The coherent light P transmits the reflecting surface 100c when in P polarization. On the other hand, the coherent light P is reflected by the reflecting surface 100c when in S polarization.

The polarized beam splitter 100 is provided on its one surface with a quarter-wave plate 101 for changing the linearly polarized coherent light P into a circularly polarized coherent light P. The coherent light P emitted from the rod lens 32 is changed from a linearly polarized light to a circularly polarized light by the quarter-wave plate 101. The circularly polarized coherent light P is introduced to a plane mirror M as a measuring light $P_2$ and reflected by the plane mirror M. The measuring light $P_2$ reflected by the plane mirror M is made incident to the quarter-wave plate 101 again. The measuring light $P_2$ becomes a linearly polarized light when it passes the quarter-wave plate 101. Since the measuring light $P_2$ is rotated in its polarizing direction by 90° here, the measuring light $P_2$ reflected the the plane mirror M and returned becomes the S-polarized light when it passes the quarter-wave plate 101.

Therefore, the S-polarized measuring light $P_2$ is reflected by the reflecting surface 101c. In front of the reflecting direction of the S-polarized measuring light $P_2$, a total reflection prism 102 is disposed. The total reflection prism 102 comprises two prisms 102a and 102b, and 102c is a reflecting surface thereof. Between the total reflection prism 102 and the rod lens 33, a half-wave plate 103 is disposed. The half-wave plate 103 functions as a mode establishing means for rotating the polarizing direction by 90°. The S-polarized measuring light $P_2$ made incident to the total reflection prism 102 is reflected by the reflecting surface 102c and made incident into the half-wave plate 103.

The S-polarized measuring light $P_2$ becomes P-polarized measuring light $P_2$ by the half-wave plate 103 and made incident to the incident wave guide path 28. The P-polarized measuring light $P_2$ interferes with the reference light $P_1$ made incident to the incident wave guide path 28 via the reference light wave guide path 29. The interference light of the measuring light $P_2$ and reference light $P_1$ is introduced to the photodetector 25 and converted into an interference signal. The reference wave guide path 29 is connected to the outgoing wave guide path 27 and incident wave guide path 28 by directional couplers 27a and 28b. In this way, since the measuring light $P_2$ reflected by the plane mirror M is reflected in the direction where the total reflection prism 102 is located by the polarized beam splitter 100, a part of the measuring light $P_2$ is prevented from returning to the laser beam light source 20, the output of the wave length of the light source is stabilized, and a correct length measurement can be carried out.

Figure 11:
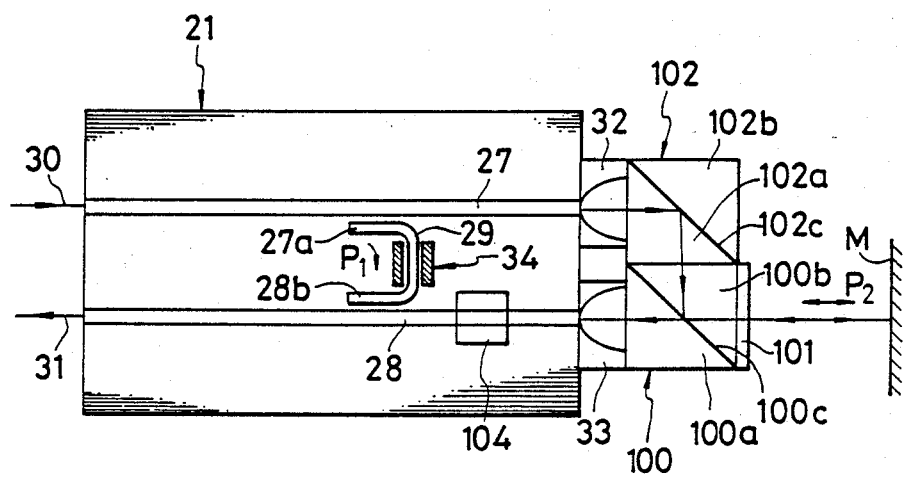

FIG. 11 illustrates the second embodiment. In this second embodiment, the rod lens 32 is attached with the total reflection prism 102, whereas the rod lens 33 is attached with the polarized beam splitter 100. In this embodiment, the laser beam light source 30 emits the TM mode coherent light P. The TM mode coherent light P is reflected by the total reflection prism 102 and the reflecting surfaces 102c and 100c of the polarized beam splitter 100. The quarter-wave plate 101 is mounted on one surface of the polarized beam splitter 100 in the same manner as the first embodiment. The measuring light $P_2$ becomes a circularly polarized light after passing through the quarter-wave plate 101 and is introduced to the plane mirror M. And, the circularly polarized measuring light $P_2$ is reflected by the plane mirror M and made incident to the quarter-wave plate 101 again. The circularly polarized measuring light $P_2$ becomes the P-polarized light after passing through the quarter-wave plate 101 and is made incident to the polarized beam splitter 100.

The P-polarized measuring light $P_2$ is transmitted through the reflecting surface 100a and made incident to the incident wave guide path 28. The incident wave guide path 28 is provided with the mode establishing means 104 between the rod lens 33 and the directional coupler 28b. The mode transformer 104 has such a function as to apply a magnetic field to the incident wave guide path 28 for example and rotate the plane of polarization of the measuring light $P_2$ propagating through the incident wave guide path 28 due to the magneto-optic effect. By this, the measuring light $P_2$ made incident to the incident wave guide path 28 as the P-polarized light becomes the S-polarized light. Accordingly, the measuring light $P_2$ made incident to the incident wave guide path 28 and S-polarized and the S-polarized reference light $P_1$ introduced to the incident wave guide path 28 via the reference wave guide path 29 are interfered with each other and become an interference light.

Figure 12:
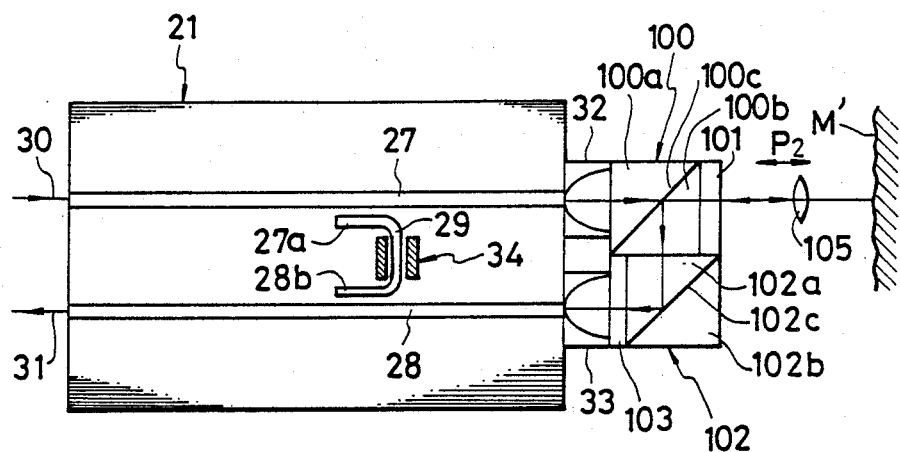

FIG. 12 illustrates the third embodiment for achieving the second object of the present invention. This third embodiment is a modified embodiment of the first embodiment. In the third embodiment, the rough surface M' is used instead of reflecting the measuring light $P_2$ using the plane mirror M. In this embodiment, the rough surface M' is disposed at the focal point of a convex lens 105.

Figure 13:
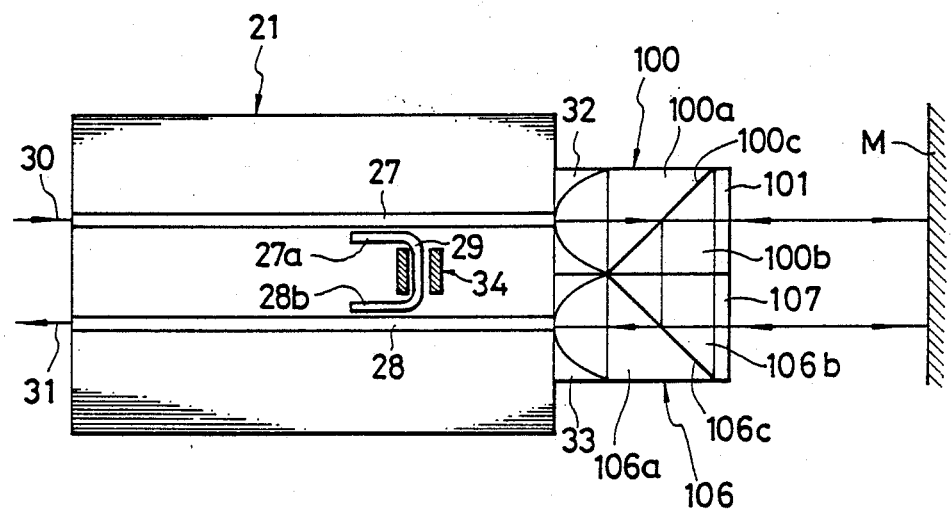

FIG. 13 illustrates the fourth embodiment for achieving the second object of the present invention. In this fourth embodiment, the measuring light P₂ is reflected twice by the plane mirror M.

In this embodiment, the measuring light P₂ outgoing from the rod lens 32 is made incident to the polarized beam splitter 100. The measuring light P₂ outgoing from the rod lens is a P-polarized light. Therefore, the measuring light P₂ is passed through the polarized beam splitter 100. And, it becomes a circularly polarized measuring light P₂ by the quarter-wave plate 101, is introduced to the plane mirror M and reflected by the plane mirror M. The measuring light P₂ reflected by the plane mirror M becomes an S-polarized light again by the quarter-wave plate 101 and is made incident to the polarized beam splitter 100. The S-polarized measuring light P₂ is reflected by the reflecting surface 100c and made incident to the polarized beam splitter 106. The polarized beam splitter 106 comprises two prisms 106a and 106b, and 106c denotes a reflecting surface thereof. The polarized beam splitter 106 is provided at its one surface with a quarter-wave plate 107. The S-polarized measuring light P₂ reflected by the polarized beam splitter 106 becomes a circularly polarized light, advances toward the plane mirror M and is then reflected by the plane mirror M again.

The circularly polarized measuring light P₂ reflected by the plane mirror M is passed through the quarter-wave plate 107 again, becomes a P-polarized light and is made incident to the polarized beam splitter 106. The measuring light P₂ made incident to the polarized beam splitter 106 is passed through the reflecting surface 106c since it is a P-polarized light and is made incident to the rod lens 33. Therefore, in this embodiment, since the measuring light P₂ is reflected twice by the plane mirror, the adverse affection of flaming of the plane mirror can be removed.

Embodiment for Achieving the Third Object

Figure 14:
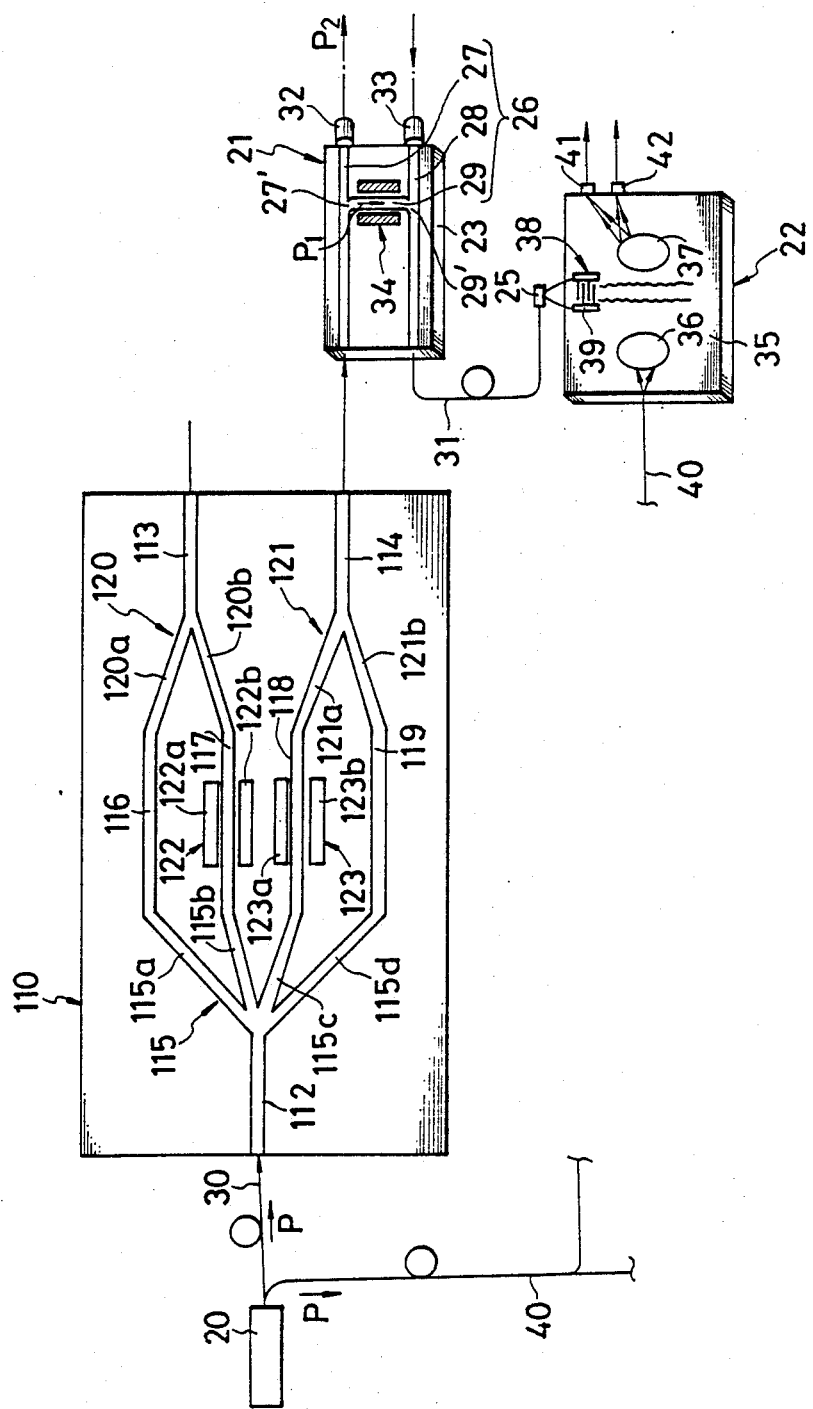
FIG. 14 is a plan view showing one embodiment for achieving the third object of the present invention.
Figure 15:
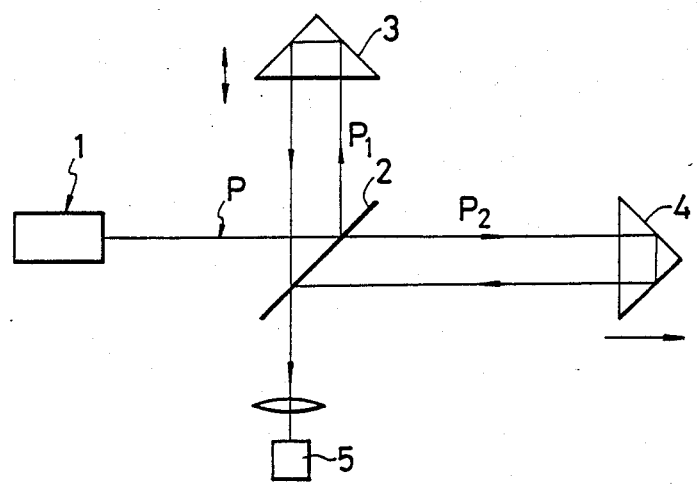
FIG. 15 is a schematic view of a conventional bulk type phase modulation interferometer.
Figure 16:
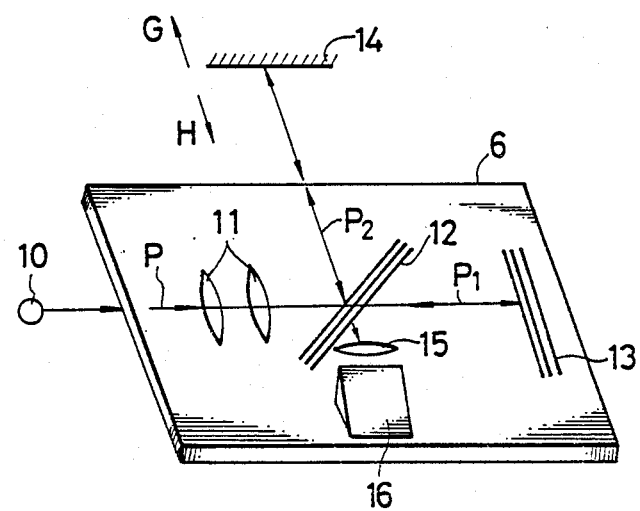
FIG. 16 is a view schematically illustrating a conventional light integrated type interferometer.
Figure 17:
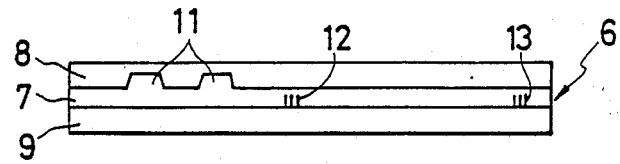
FIG. 17 is a side view of the light integrated interferometer of FIG. 16.
Figure 18:
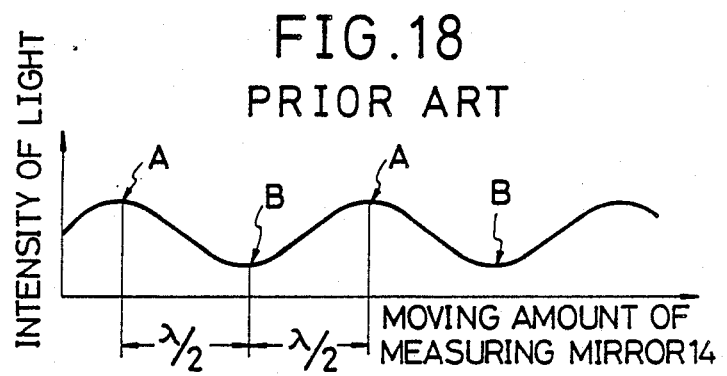
FIG. 18 is an illustration for explaining the change of intensity of an interference light obtained by the light integrated type interferometer.

In FIG. 14, 110 denotes a substrate of several mm angle comprising lithium niobate, etc., for example. The substrate 110 is formed thereon with an inlet wave guide path 112 extending from a left end portion (in the figure) toward a central portion, a first and a second outgoing wave guide paths 113 and 114 extending from a central portion toward a right end portion, a branch wave guide path 115 for branching a coherent light P propagating through the inlet wave guide path 112 and propagating thereof, parallel wave guide paths 116 through 119 optically connected to the branch wave guide path 115 and extending in parallel relation, and Y-shaped joint wave guide paths 120 and 121 optically connected to the parallel wave guide paths 116 through 119 and connecting the parallel wave guide paths 116 through 119 and the first and second outgoing wave guide paths 113 and 114. The branch path 115, in this embodiment, comprises branch paths 115a, 115b, 115c and 115d whereas the Y-shaped joint wave guide paths 120 and 121, in this embodiment, comprise joint paths 120a, 120b, 121a and 121b. The various wave guide paths are formed by selectively thermodiffusing a titanium, for example, on the substrate 110.

Also, the substrate 110 is formed in the vicinity of the parallel wave guide paths 117 and 118 with optical path length changing devices (optical path length changing means) 122 and 123. The optical path length changing devices 122, 123 comprise planar electrodes 122a, 122b, 123a and 123b disposed in the vicinity of the parallel wave guide paths 117 and 118. When voltage is incurred to the planer electrodes 122a, 122b, 123a and 123b, the refractive indexes of the parallel wave guide paths 117 and 118 between the electrodes 112a and 122b, and 123a and 123b are changed due to the electro-optic effect and the optical distance of the parallel wave guide paths 117 and 118 is changed.

When the coherent light P outgoing from the laser beam light source 20 is made incident to the inlet wave guide path 112, the coherent light P is propagated through the inlet wave guide path 112, branched by the branch wave guide path 115, and propagated through the various branch paths 115a, 115b, 115c and 115d. The coherent light P propagating through the branch paths 115a and 115b is propagated through the parallel wave guide paths 116 and 117 and introduced to the first outgoing wave guide path 113 through the Y-shaped joint wave guide path 120. Similarly, the coherent light P propagating the branch paths 115c and 115d is propagated through the parallel wave guide paths 118 and 119 and is introduced to the second outgoing wave guide path 114 through the Y-shaped joint wave guide path 121.

At this time, voltage is incurred to spaces between the planer electrodes 122a and 122b, and 123a and 123b to change the optical paths of the parallel wave guide paths 118 and 119, thereby to make the optical difference between the wave guide paths 115a, 116 and 120a and the wave guide paths 115b, 117 and 120b to $(\frac{1}{2})\lambda + n\lambda$ (wherein n is integer) and to make the optical difference between the wave guide paths 115c, 118 and 121a and the wave guide paths 115d, 119 and 121b to $n\lambda$ (wherein n is integer). Then, the phase difference of the coherent light P propagating through the joint path 120a of the Y-shaped joint wave guide path 120 and the coherent light P propagating through the joint 120b becomes $\pi$, and since these are denied with each other due to interference, the coherent light P is not emitted from the first outgoing wave guide path 113. On the other hand, the phase difference of the coherent light P propagating through the joint path 121a of the Y-shaped joint wave guide path 121 and the coherent light P propagating through the joint path 121b becomes $2\pi$, and since they are intensified with each other, the coherent light P is emitted from the second outgoing wave guide path 114.

Next, the optical path length of the parallel wave guide paths 118 and 119 are changed to make the optical path difference $n\lambda$ (wherein n is integer) between the wave guide paths 115a, 116 and 120a and the wave guide paths 115b, 117 and 120b and to make the optical path $(\frac{1}{2})\lambda + n\lambda$ (wherein n is integer) between the wave guide paths 115c, 118 and 121a and the wave guide paths 115d, 119 and 121b. Then, the coherent light P is emitted from the first outgoing wave guide path 113 and the coherent light P is not emitted from the second outgoing wave guide path 114.

Accordingly, if this optical integrated circuit element is used, by changing the voltage incurred to spaces between the planer electrodes 122a and 122b, and 123a and 123b, the coherent light can be switched between the first outgoing wave guide path 113 and the second outgoing wave guide path 114. As a result, if a plurality of light integrated type interferometer 21 is optically connected to each outgoing wave guide path, the various light integrated type interferometers 21 can be selectively used. Furthermore, in the case of this integrated circuit element, if both optical paths are established so as to be displaced by $\pi$ in phase difference, the coherent light P propagating through the inlet wave guide path 112 is not emitted from the outgoing wave guide paths 113 and 114 and therefore it functions as a switch. Although two outgoing wave guide paths are provided in the embodiment, the present invention is not limited to this.

What is claimed is:

1. A light interferometer comprising an interferometer means for interfering a measuring light and a reference light, and a light signal processing means for processing a signal according to an interference signal which changes according to the change of an optical path length of the measuring light;

said interferometer portion including a first light source means for generating a coherent light, a light interference means for dividing the coherent light emitted by said first light source into a reference light and a measuring light in order to introduce the measuring light to an object, means for making the measuring light reflected by said object and the reference light interfere with each other and for introducing the interfered light to a photo detector, and an optical path length periodically vibrated changing means for periodically changing the difference between an optical path length of the reference light with an optical path length of the measuring light at a substantially constant amplitude; and said light signal processing means including a second light source for generating a coherent light, a collimate lens means for collimating the coherent light emitted by said second light source, a space modulating means for diffracting the coherent light outgoing from said collimate lens means, a Fourier transforming means for transforming the diffracted coherent light, and two photodetectors, one disposed at a spot corresponding to a frequency composition equivalent to a frequency of said optical path length periodically vibrated changing means and the other disposed at a spot corresponding to a frequency composition two times the first-mentioned frequency composition in order to extract these frequency compositions out of frequency compositions which have been decomposed in frequency spectral by said Fourier transforming means.

2. A light interferometer according to claim 1, wherein said light interference means of said interferometer means comprises an optical integrated circuit type interferometer including a thin film substrate formed with a wave guide path, and said thin film substrate is formed of a material having an electro-optic effect.

3. A light interferometer according to claim 2, wherein said optical path length periodically vibrated changing means comprises an electrode disposed at said wave guide path and incurred with a voltage of a predetermined cycle.

4. A light interferometer according to claim 2, wherein said wave guide path comprises an outgoing wave guide path for emitting a measuring light toward said object, an incident wave guide path for introducing a measuring light reflected by said object, and a reference wave guide path branched from said outgoing wave guide path and adapted to divide and take off the reference light from said outgoing wave guide path and converge it to said incident wave guide path.

5. A light interferometer according to claim 4, wherein said optical path length periodically vibrated changing means comprises an electrode disposed in the vicinity of said reference wave guide path and incurred with a voltage at a predetermined cycle.

6. A light interferometer according to claim 4, wherein said optical path length periodically vibrated changing means comprises an electrode disposed in the vicinity of said outgoing wave guide path and at an outgoing side than a branch portion of said reference wave guide path and incurred with a voltage of at a predetermined cycle.

7. A light interferometer according to claim 4, wherein said optical path length periodically vibrated changing means comprises an electrode disposed in the vicinity of said incident wave guide path and at an incident side than the converged portion of said reference wave guide path and incurred with a voltage at a predetermined cycle.

8. A light interferometer according to claim 1, wherein said wave guide path is a two-dimensional wave guide path and is constituted as a recurrent optical system.

9. A light interferometer according to claim 1, wherein said light signal processing portion is a light integrated type spectral analyzer comprising a thin film substrate formed thereon with said collimate lens means, said space modulating means, said Fourier transforming lens means and said two photodetectors.

10. A light interferometer according to claim 9, wherein said collimate lens portion and said Fourier transforming lens means comprise a geodesic lens.

11. A light interferometer according to claim 9, wherein said collimate lens means and said Fourier transforming lens means comprise a grating lens.

12. A light interferometer according to claim 9, wherein said space modulating means is a SAW transducer.

13. An optical integrated circuit type interferometer including a light source means for generating a coherent light, a thin film substrate formed with a wave guide path for dividing a coherent light emitted from said light source means into a reference light and a measuring light, means for introducing said measuring light to an object, means for making said measuring light reflected by said object interfere with said reference light and for introducing the interfered light to a photodetector, and an optical path length periodically changing means for periodically changing the difference of an optical path length of said reference light with respect to that of said measuring light at a substantially constant amplitude.

14. An optical integrated circuit type interferometer according to claim 13, wherein said optical path length periodically changing means comprises an electrode disposed at said wave guide path and incurred with a voltage at a predetermined cycle.

15. An optical integrated circuit type interferometer according to claim 13, wherein said wave guide comprises an outgoing wave guide path for emitting a measuring light toward said object, an incident wave guide path for introducing a measuring light reflected by said object to said photodetector, and a reference wave guide path branched from said outgoing wave guide path and adapted to divide and take off the reference light from said outgoing wave guide path and converge the reference light to said incident wave guide path.

16. An optical integrated circuit type interferometer according to claim 15, wherein said optical path length periodically changing means comprises an electrode disposed in the vicinity of said reference wave guide path and incurred with a voltage at a predetermined cycle.

17. An optical integrated circuit type interferometer according to claim 15, wherein said optical path length periodically changing means comprises an electrode disposed in the vicinity of said outgoing wave guide path and at an outgoing side than the branched portion of said reference wave guide path and incurred with a voltage at a predetermined cycle.

18. An optical integrated circuit type interferometer according to claim 15, wherein said optical path length periodically changing means comprises an electrode disposed in the vicinity of said incident wave guide path and at an incident side than the converged portion of said reference wave guide path and incurred with a voltage at a predetermined cycle.

19. An optical integrated circuit type interferometer according to claim 13, wherein said optical path length periodically changing means is constituted as such that said thin film substrate itself is periodically vibrated at a constant amplitude in the outgoing direction of the measuring light in order to periodically changing the difference of the optical path length between the reference light with respect to that of the measuring light at a constant amplitude.

20. An optical integrated circuit type interferometer according to claim 13, wherein said light guide path is a two-dimensional wave guide path and is constituted as a recurrent optical system.

21. A light interferometer comprising:

a light source means for generating a linearly polarized coherent light;

a thin film substrate formed with an outgoing wave guide path for emitting the coherent light emitted from said light source means toward an object as a measuring light, a reference wave guide path optically connected to said outgoing wave guide path and adapted to divide said coherent light into said reference light and said measuring light, and an incident wave guide path optically connected with said reference wave guide path and adapted to make the measuring light reflected by said object interfere with said reference light and introduce the interfered light to a photodetector;

an optical path length periodically changing means for periodically changing the difference of an optical path length of said reference light with respect to that of said measuring light at a substantially constant amplitude;

a measuring light polarizing means, disposed at said thin film substrate, for polarizing the coherent light such that the coherent light emitted toward said object and reflected by said object is not made incident to said outgoing wave guide path and is made incident to said incident wave guide path; and a mode establishing means for establishing a polarizing mode of the measuring light made incident to said incident wave guide path to a polarizing mode of said reference light.

* * * * *